(12) United States Patent
Kibi et al.

(10) Patent No.: US 6,219,221 B1
(45) Date of Patent: Apr. 17, 2001

(54) ELECTRICAL DOUBLE LAYER CAPACITOR HAVING SHORT-CIRCUIT FUNCTION

(75) Inventors: Yukari Kibi; Takashi Saito, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/310,860

(22) Filed: May 13, 1999

(30) Foreign Application Priority Data

May 15, 1998 (JP) .................................................. 10-133928

(51) Int. Cl.⁷ ....................................................... H01G 9/00
(52) U.S. Cl. ............................................. 361/502; 361/522
(58) Field of Search .................................... 361/502, 522, 361/534, 434, 104, 90, 257; 320/15

(56) References Cited

U.S. PATENT DOCUMENTS 4,737,889 * 4/1988 Nishino et al. ...................... 361/502
5,172,307 * 12/1992 Tabuchi et al. ...................... 361/502
6,072,691 * 6/2000 Suhara et al. ....................... 360/502

FOREIGN PATENT DOCUMENTS 62-4848  2/1987 (JP) .
6-30247  2/1994 (JP) .

* cited by examiner

Primary Examiner—Anthony Dinkins
(74) Attorney, Agent, or Firm—Sughrue, Mion, Zinn, Macpeak & Seas, PLLC (57) ABSTRACT

To reduce a disparity of voltage between each unit electrical double layer capacitor without an electrical loss when a plurality of the unit electrical double layer capacitors are connected in series to provide an electrical double layer capacitor, a switching element is connected in parallel to each unit electrical double layer capacitor to be individually short-circuited during discharging of the electrical double layer capacitor.

11 Claims, 6 Drawing Sheets

ELECTRICAL DOUBLE LAYER CAPACITOR HAVING SHORT-CIRCUIT FUNCTION

BACKGROUND OF THE INVENTION

1. Field of the Invention

This invention relates to an electrical double layer capacitor device and, more particularly, to a device formed by a plurality of electrical double layer capacitors connected in series.

2. Description of the Prior Art

An electrical double layer capacitor device of the type described has a low resistance and a large capacity. Because the electrical double layer capacitor device does not cause any chemical reaction to occur unlike a battery, its deterioration is very small due to repetition of charging and discharging. Therefore, the device can be often used as an accumulator free of maintenance. Further, because the electrical double layer capacitor device contains no harmful substance such as heavy metal as its component material, it is no harmful to the environment. Using this advantage, the electrical double layer capacitor device has been widely used as a memory backup device. Generally, the electrical double layer capacitor is connected to a battery or a power source obtained by converting commercial AC power to DC power, in parallel. Electric charge accumulated in the electrical double layer capacitor backs up various parts when the power source happens to be interrupted. Further, the electrical double layer capacitor device has been developed recently which has a tremendously large capacity, so that it is expected to be used as a battery substitutive component or assistant component for motor drive. This shows that such a device can not only to back up the memory but also to back up the entire system. Particularly, the electrical double layer capacitor device has been recently developed for power application excellent in large current characteristic because of demand for a power source of electrical vehicle or hybrid vehicle.

By the way, such an electrical double layer capacitor has an application voltage limited below a electrolytic voltage of used electrolyte. The voltage limit is about 1 V when water solution base electrolyte, such as sulfuric acid is used. In addition, it is about 2.5 V when organic solvent base electrolyte, such as propylene carbonate, is used. When a voltage is applied which exceeds this limit voltage, the service life of the capacitor is reduced considerably. Therefore, it is necessary to connect a required number thereof in series when the capacitor is used under an environment over the limit voltage.

However, if a voltage is applied to the capacitor device in which the unit capacitors are connected in series, a disparity takes place in the voltage applied to each unit capacitor owing to the disparity of the capacity and internal resistance of each unit capacitor. Further, this disparity may be increased by means of repeated charging and discharging. As a result, a voltage exceeding the limit voltage is applied to the unit capacitor so that a destruction may be occurred thereof.

As a method of suppressing the disparity of the voltage between the unit capacitors Japanese Unexamined Patent Publication (JP-A) No. SHO 62-4848 (hereinafter referred to as document 1) has disclosed a method of reducing the disparity of the voltage applied to the unit capacitors by connecting a plurality of resistors having a equal resistance in parallel. Further, Japanese Unexamined Patent Publication (JP-A) NO. HEI 6-30247 (hereinafter referred to as document 2) has disclosed a method in which a protective circuit comprises a Zener diode and resistor which are connected in series and is connected to the unit capacitor in parallel.

However, because, according to the method indicated in the above document 1, it is necessary to connect resistances 1/5–1/10 of the insulating resistance of each unit capacitor, respectively as described in the document 1, the leakage current of the entire capacitor is increased five to ten folds as compared to a case in which no resistor is connected. Therefore, a problem exists in which the electric loss is increased tremendously.

Further, because, according to the method described in the above document 2, a current always flows through the protective circuit like the method indicated in the above document 1, a problem is left that power consumption is large. The method of controlling the voltage by such a bypass current is effective when the charging time is very long. However, the by-pass current is increased considerably when charging is carried out in a short time interval of several seconds order. The protective circuit is not practically available by the use of such a large current because not only a power consumption is large but also the parts are very expensive. Further, because the voltages of all the unit capacitor needs to be mentioned according to these control methods by controlling the charging voltage, a problem exists that the protective circuit is complicated and costly.

SUMMARY OF THE INVENTION

Accordingly, it is an object of the present invention to provide an electrical double layer capacitor capable of reducing a disparity of voltage between unit capacitors without an electrical loss when an electrical double layer capacitor is composed by connecting the unit capacitors in series.

According to an aspect of the present invention, there is provided an electrical double layer capacitor device comprising a plurality of unit electrical double layer capacitors connected in series and a short-circuiting mechanism for short-circuiting each of the electrical double layer capacitors during a discharging.

In the aspect of the present invention, it is preferable that the short-circuiting mechanism comprises a switching element connected to each of the unit electrical double layer capacitors in parallel. Further preferably, the short-circuiting mechanism further comprises an external switch for controlling an operation of the switching element.

In the aspect of the present invention, it is preferable that the switching element is composed of an element selected from a group consisting of a thyrister, a triac, a power transistor, a power MOS FET and an insulated gate bipolar transistor.

Further, in the aspect of the present invention, it is preferable that the unit double layer capacitor comprises a pair of collectors, a pair of polarized electrodes disposed between the collectors, a separator sandwiched between the polarized electrodes, electrolyte filled in the polarized electrodes and separator and a gasket disposed around the polarized electrode and bonded to the collectors, wherein the unit double layer capacitors are stacked on a surface of the collector so that they are connected in series.

Further, according to another aspect of the present invention, there is provides an electrical double layer capacitor which comprises a plurality of unit electrical double layer capacitors in series and a control circuit connected to the unit electrical double layer capacitor in parallel. In the electrical double layer, the control circuit includes a switching element.

In the aspect of the present invention, it is preferable that the control circuit further comprises a resistor connected to the switching element in series. More preferably, the resistor may be a variable resistor.

In the aspect of the present invention, it is preferable that the switching element is composed of an element selected from a group consisting of a thyrister, a triac, a power transistor, a power MOS FET and an insulated gate bipolar transistor.

In the aspect of the present invention, it is preferable that the control circuit further comprises an external switch for controlling an operation of the switching element In the aspect of the present invention, it is preferable that the unit double layer capacitor comprises a pair of collectors, a pair of polarized electrodes disposed between the collectors, a separator sandwiched between the polarized electrodes, electrolyte filled in the polarized electrodes and separator and a gasket disposed around the polarized electrode and bonded to the collectors and that the unit double layer capacitors are stacked on a surface of the collector so that they are connected in series and the switching element or the control circuit is integral with the gasket.

According to the electrical double layer capacitor of the present invention, by short-circuiting each unit double layer capacitor (hereinafter sometimes referred to as the unit capacitor) during discharging, the disparity of the voltage between the unit capacitors can be suppressed.

Specifically, the present invention has an effect of suppressing an enlargement of the disparity of the voltage That is, according to the present invention, by short-circuiting the unit capacitor during discharging, residual charge of each capacitor is reset. As a result, the disparity of the voltage between the unit capacitors can be suppressed within an initial disparity range. The aforementioned conventional method for suppressing the disparity of the voltage is to throw out electric charge through a bypass circuit at the time of charging so that a upper limit of the voltage is not exceeded.

The present invention is different from such a conventional means but is capable of suppressing the disparity of voltage between the unit capacitors without an electric loss so as to achieve a long service life of the capacitor.

Further, by short-circuiting the unit capacitor when the capacitor is discharged so that the voltage reaches about 0 V, the voltage can be controlled by a simple circuit without the necessity of monitoring the voltage of each unit capacitor or setting a upper limit or a lower limit thereof. Further, the short-circuit current of each unit capacitor can be suppressed to a small value.

By inserting a variable resistor into the control circuit, the short-circuit current can be adjusted. Further, the short-circuiting of each unit capacitor is not required to be carried out each time when charging/discharging is done, but it is effective even if it is carried out at an appropriate timing.

DESCRIPTION OF THE PREFERRED EMBODIMENTS

Before a description of the embodiment of the present invention, an electrical double layer capacitor device of the prior art will be described with reference to FIG. 1 to facilitate an understanding of the present invention.

Figure 1:
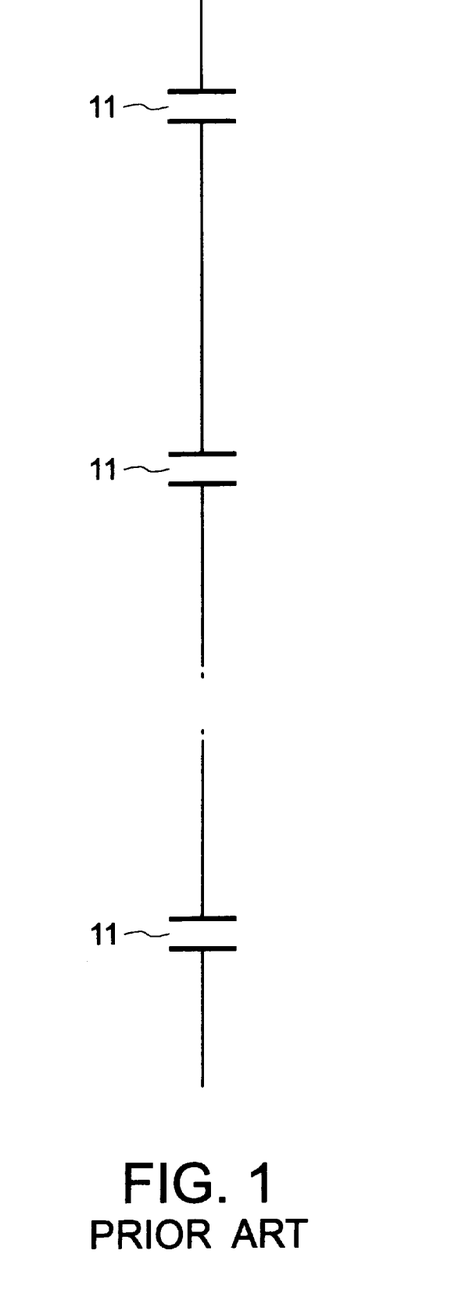
FIG. 1 is a circuit diagram showing an example of a conventional electrical double layer capacitor.

Referring to FIG. 1, unit capacitors 11 are connected in series. when a voltage is applied to the capacitors connected in series, a disparity takes place in voltage applied to each unit capacitor because of a disparity of the capacity and internal resistance of each unit capacitor 11. Further, this disparity may be expanded by repeating of charging and discharging. As a result, the unit capacitor 11 may be destroyed because a voltage larger than its limit value is applied.

Now, the embodiment of the present invention will be described with reference to FIGS. 2 to 8.

First, a first embodiment of the present invention will be described with reference to FIGS. 2 to 4.

Figure 2:
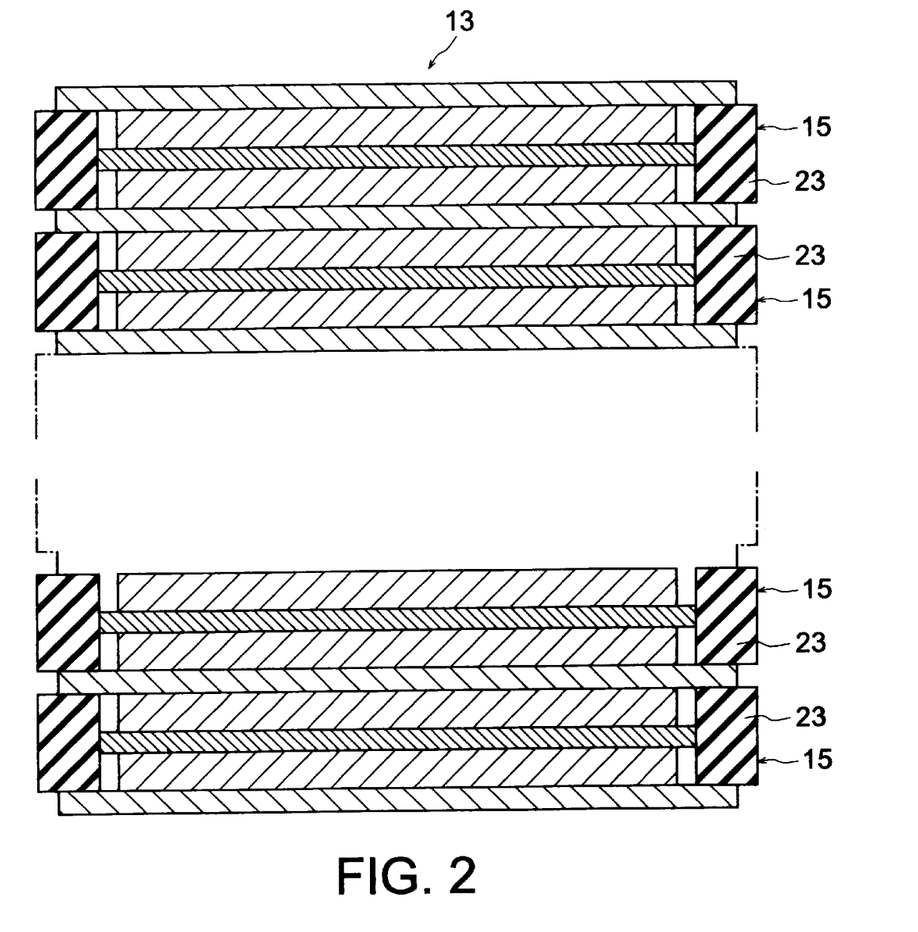
FIG. 2 is a sectional view showing an electrical double layer capacitor according to a first embodiment of the present invention.

Referring to FIG. 2, an electrical double layer capacitor device (hereinafter referred to as capacitor device) 13 according to the first embodiment of the present invention comprises unit electrical double layer capacitors (hereinafter referred to as unit capacitor) 15, which are connected in series, shown in FIG. 1.

Figure 3:
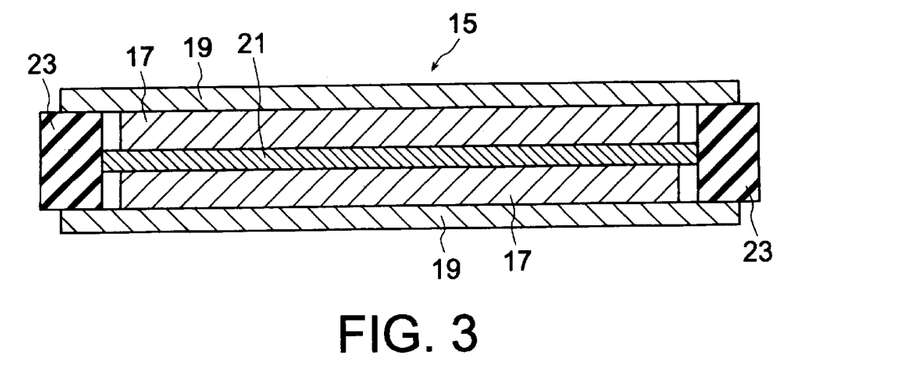
FIG. 3 is a sectional view showing the unit electrical double layer capacitor of FIG. 2.

Referring to FIG. 3, the unit electrical double layer capacitor 15 (hereinafter referred to as unit capacitor) according to a first embodiment of the present invention contains a pair of polarized electrodes 17 using activated charcoal having a large surface ratio, sandwiched by a pair of collectors 19. A separator 21 is disposed between the polarized electrodes 17, 17 to prevent a short-circuit and the polarized electrodes 17 and separator 21 are soaked in electrolyte. A gasket 23 is disposed around the electrical double layer capacitor device 13 so that it is bonded to a peripheral end portion of the collectors 17, in order to prevent a leakage of internal electrolyte to outside. According to the first embodiment of the present invention, water solution of sulfuric acid is used as an electrolyte.

Figure 4:
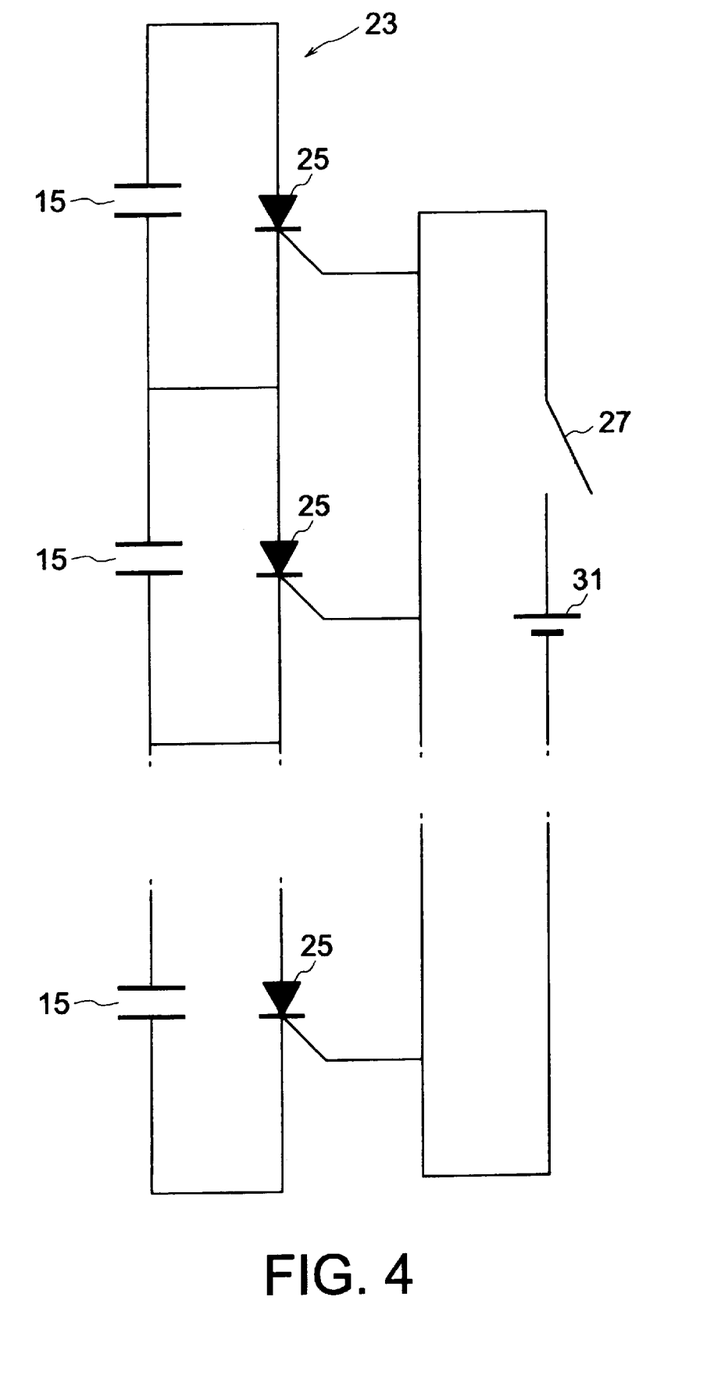
FIG. 4 is a circuit diagram showing the electrical double layer capacitor of FIG. 2.

Referring to FIG. 4, according to the first embodiment of the present invention, a thyrister 25 is connected as a switching element to each unit electrical double layer capacitor 15 in parallel, and circuits each comprising the unit electrical double layer capacitor 15 and thyrister 25 are connected in series. All gate signals to each thyrister 25 are controlled by an external switch 27 in common. The thyristers 25 and external switch 27 compose a short-circuit arrangement. A circuit to be connected to each unit electrical double layer capacitor 15 in parallel is integrally formed into one body so as to be buried in the gasket 23. Further, the disparity of the capacitor of each unit electrical double layer capacitor 15 is desired to be as small as possible.

Next, a second embodiment of the present invention will be described with reference to FIG. 5.

Figure 5:
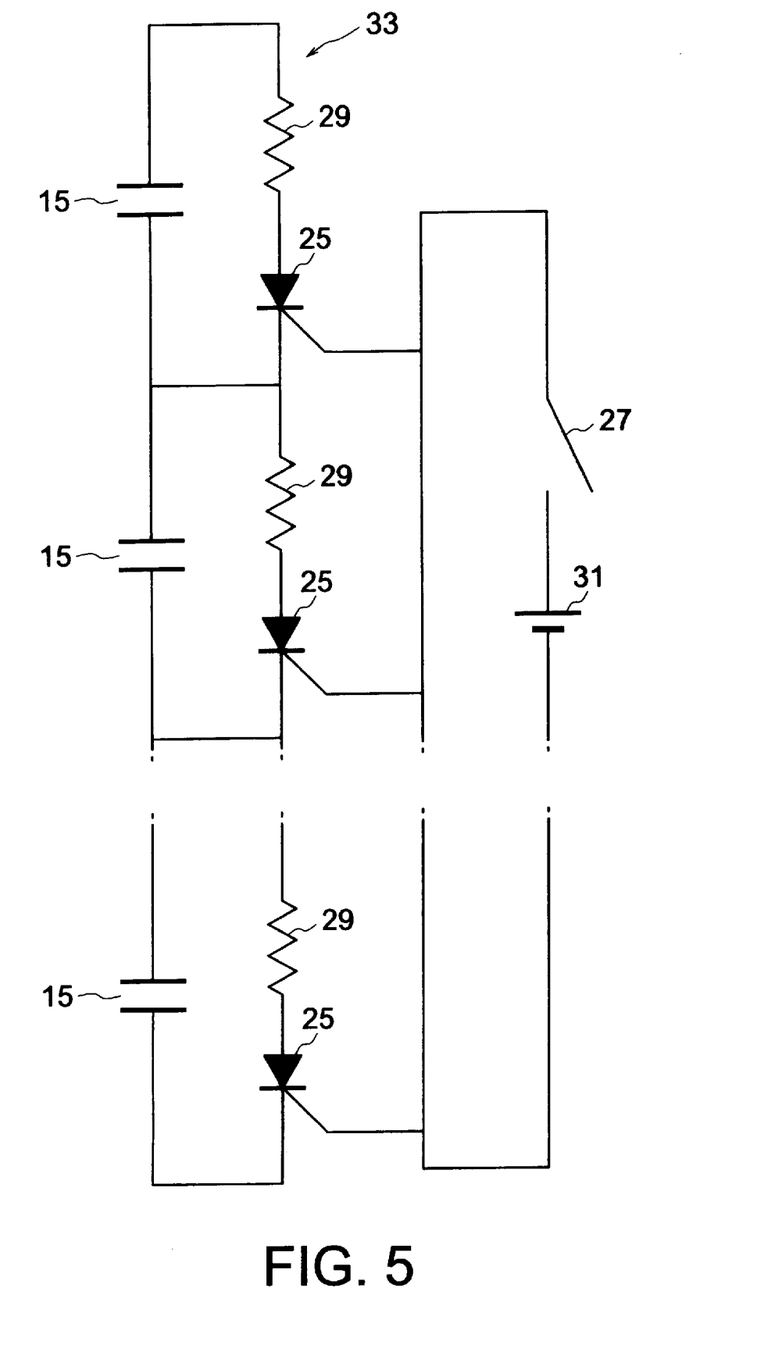
FIG. 5 is a circuit diagram showing an embodiment of the electrical double layer capacitor according to a second embodiment of the present invention.

Referring to FIG. 5, the electrical double layer capacitor device 33 utilizes the same unit capacitor 15 as in the first embodiment.

In the second embodiment, each unit capacitor is connected wit a control circuit in which a thyrister 25 and a resistor 29 are connected in series to form circuits, each of which comprises the unit capacitor 15, thyrister 25 and resistor 29. The circuits are connected in series. All gate signals to the thyristers are common and controlled by the external switch 27. The circuit to be connected to each unit capacitor 15 is integrally formed into one body so as to be buried in the gasket 23 like the one shown in FIG. 4. Further, the disparity of the capacity of each unit capacitor 15 is desired to be as small as possible.

Next, the electrical double layer capacitor devices according to the first and second embodiments of the present invention were produced and then their characteristics were investigated.

EXAMPLE 1

An electrical double layer capacitor having a structure shown in FIG. 4 was produced and initial characteristics of an internal resistance and capacity of the capacitor were measured.

Although the disparity of the capacity of each unit capacitor forming the electrical double layer capacitor was desired to be as small as possible, in this embodiment to have a significant effect of the invention, a unit capacitor whose capacity was smaller than the other ones by 10% was used for only a unit capacity of the ones connected in series. In this embodiment, 15 unit capacitors were connected in series. Table 1 shows obtained initial characteristics of the internal resistance and capacity of the entire capacity.

Next, the following charge/discharge test was carried out on the capacitor of Example 1. 100 A constant current charging was carried out until the voltage between both the ends of the entire capacitor rose from 6 V to 12 V and next, 100 A constant current discharging was carried out from 12 V to 6 V. At this time, the charging time and discharging time were three seconds each and rest time of 24 seconds was taken after discharging. Charging/discharging pattern of 30 seconds per cycle was repeated on the capacitor of this embodiment. This charging/discharging cycle test was repeated by 10,000 times and then the charging/discharging test was interrupted to short-circuit both the ends of the entire capacitor. Then, when the voltage on both the ends dropped below 0.1 V, the external switch 7 was turned ON to short-circuit each unit capacitor. After that, the charging/discharging cycle test was started. The same short-circuit was carried out at the frequency of once per 10,000 times of the charging/discharging cycle. The internal resistance and capacity after the charging/discharging cycle test was repeated 100,000 times are as shown in Table 1.

EXAMPLE 2

An electrical double layer capacitor having a structure shown in FIG. 5 was produced and initial characteristics of an internal resistance and capacity of the capacitor were measured.

Although the disparity of the capacity of each unit capacitor forming the electrical double layer capacitor was desired to be as small as possible, in this embodiment to have a significant effect of the invention, a unit capacitor whose capacity was smaller than the other ones by 10% was used for only a unit capacity of the ones connected in series. In this embodiment, 15 unit capacitors were connected in series. Table 1 shows obtained initial characteristics of the internal resistance and capacity of the entire capacity.

Next, the following charge/discharge test was carried out on the capacitor of Example 2. 100 A constant current was charged until the voltage between both the ends of the entire capacitor rose from 6 V to 12 V and next, 100 A constant current was discharged from 12 V to 6 V. At this time, the charging time and discharging time were three seconds each and rest time of 24 seconds was taken after discharging. Charging/discharging pattern of 30 seconds per cycle was repeated. This charging/discharging cycle test was repeated by 10,000 times and then the charging/discharging test was interrupted and the external switch 11 was turned ON to short-circuit each unit capacitor.

At this time, the short-circuit current flowing through the unit capacitor can be controlled by a resistance of a variable resistor of a control circuit connected in parallel and the voltage of the capacitor. Then, the charging/discharging cycle was started and the same short-circuit was repeated once per 10,000 times. The internal resistance and capacity after the charging/discharging cycle was repeated 100,000 times are shown in Table 1.

Comparative Example

A capacitor having a structure shown in FIG. 1 was produced as a conventional example for comparison. The same unit capacitors 11 as the above described example 1 were used and 15 unit capacitors 11 were connected in series. Although the disparity of the unit capacitor is desired to be as small as possible, in this comparative example to have a significant effect, a unit capacitor whose capacity was smaller by 10% than the other ones was used for a unit capacitor of the capacitors connected in series, and Table 1 shows the obtained initial characteristics of the internal resistance and capacity of the entire capacitor.

Then, the charging/discharging test was carried out on the capacitor of this comparative example. Charging was carried out with 100 A constant current until the voltage on both the ends of the entire capacitor rose from 6 V to 12 V and then discharging with 100 A was carried out from 12 V to 6 V. At this time, the charging time and discharging time were three seconds. Further, a rest time of 24 seconds was taken and charging/discharging was repeated at 1 cycle per 30 seconds. The internal capacity and capacity after this charging/discharging cycle was repeated 100,000 times are shown in Table 1.

TABLE 1

| | | BEFORE CHARGING AND DISCHARGING TEST | AFTER CHARGING AND DISCHARGING TEST |
|---|---|---|---|
| EXAMPLE 1 | INTERNAL RESISTANCE (MΩ) | 7.5 | 7.7 |
| | CAPACITY (F) | 82.4 | 82.3 |
| EXAMPLE 2 | INTERNAL RESISTANCE (MΩ) | 7.7 | 80 |
| | CAPACITY (F) | 81.3 | 82.1 |

TABLE 1-continued

|  |  | BEFORE CHARGING AND DISCHARGING TEST | AFTER CHARGING AND DISCHARGING TEST |
|---|---|---|---|
| COMPARA-TIVE EXAMPLE | INTERNAL RESISTANCE (MΩ) | 7.4 | 13.5 |
|  | CAPACITY (F) | 82.2 | 62.1 |

As for the capacitor of the comparative example in which the switching element or control circuit is not connected to each unit capacitor in parallel, therefore short-circuit can not be done during charging/discharging test as evident from Table 1, after the charging/discharging was repeated 100,000, the internal resistance was increased about twofold and the capacity was reduced by about 25%. However, a rise of the internal resistance after charging/discharging of 100,000 times can be suppressed to less than 5% by short-circuiting each unit capacitor at the frequency of once per 10,000 times like the examples 1 and 2, the capacity was little changed. This result is according to the following reasons.

Figure 6:
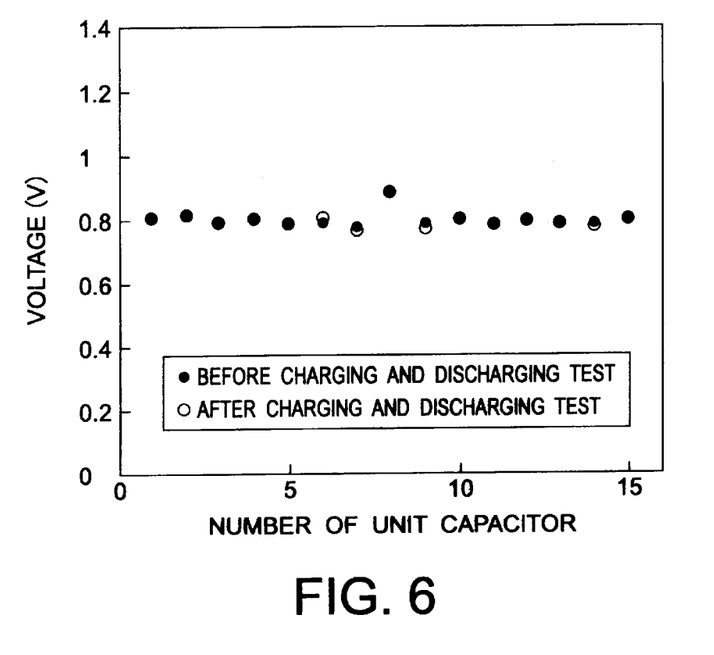
FIG. 6 is an explanatory diagram of voltage changes in each unit capacitor before and after charging/discharging test is made on the electrical double layer capacitor of each example.
Figure 7:
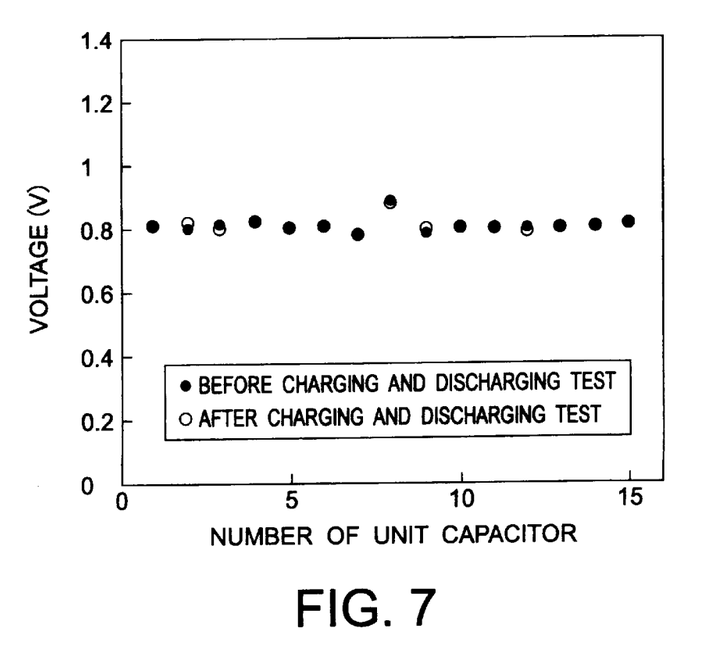
FIG. 7 is an explanatory diagram of voltage changes in each unit capacitor before and after charging/discharging test is made on the electrical double layer capacitor of each example.
Figure 8:
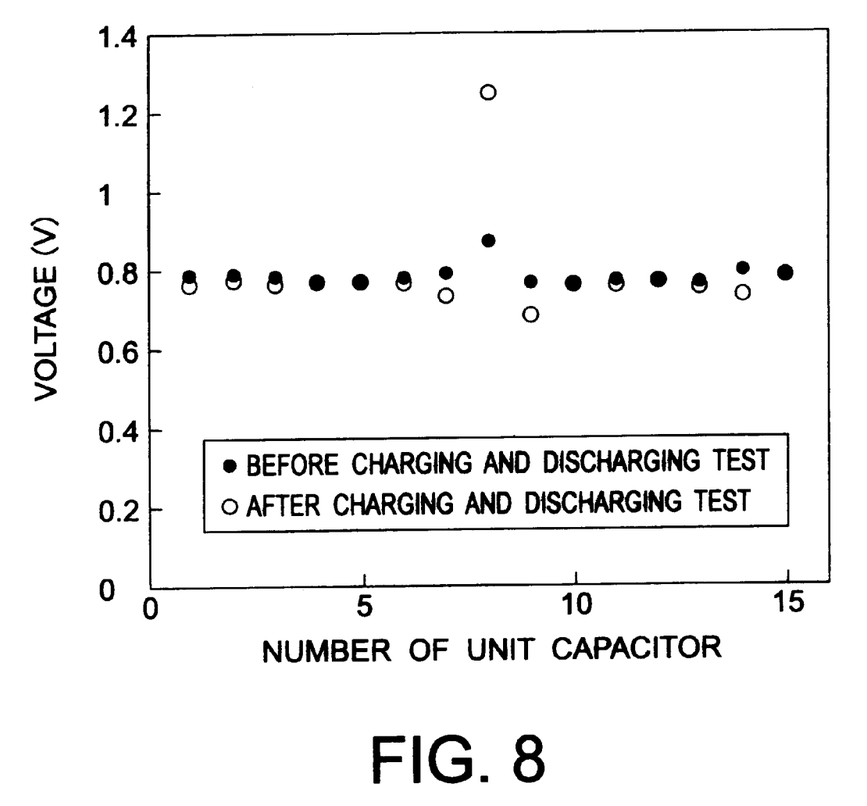
FIG. 8 is an explanatory diagram of voltage changes in each unit capacitor before and after charging/discharging test is made on the electrical double layer capacitor of a comparative example.

Referring to FIGS. 6, 7 and 8, the voltages before the charging/discharging test and after the charging/discharging test will be described about 15 unit capacitors constituting the capacitors of the examples 1, 2 and comparative example. The voltage of each unit capacitor was measured at the moment when the voltage of the entire capacitor reached 12 V as a result of charging with 100 A. Because the voltage during a charging with the constant current depends on the capacity of each unit capacitor, the voltage of the unit capacitor whose capacity is set to be smaller by 10% than the other unit capacitors is higher about by 10%. This tendency before the charging/discharging test is almost the same for the capacitors of the examples 1, 2 and the comparative example. However, the voltages after the charging/discharging test is almost the same as before the charging/discharging in the capacitors of the examples 1, 2 shown in FIGS. 6, 7. For the prior art capacitor in FIG. 8, after the charging/discharging, a difference in voltage between the unit capacitor whose capacity was smaller by 10% and the other unit capacitor was increased largely as compared to the difference before the charging/discharging. As a result, a voltage of over 1.0 V was applied to the unit capacitor whose capacity was small, so that the internal resistance of this unit capacitor rose as compared to the others. Therefore, the internal resistance of the entire capacitor rose thereby causing a drop of the capacity due to a loss by the internal resistance.

If a large current charging/discharging for a short time as done in this test is repeated in the unit capacitor supplied with a higher voltage than the others, sometimes the voltage rises further. Therefore, by short-circuiting once per 10,000 times like in the examples 1, 2, there occurs an effect in which an enlargement of the difference in voltage is reset.

In the electrical double layer capacitor using organic electrolyte, the same effect as the above examples 1, 2 was obtained. Further, even if any one of a triac, power transistor, power MOS FET or insulating gate bipolar transistor is used as well as a thyristor as a switching element, the same effect was obtained.

As described above, according to the present invention, an enlargement of the disparity of the voltage between the unit capacitors of the electrical double layer capacitor in which a plurality of the unit double layer capacitors are connected in series can be prevented by short-circuiting each unit capacitor during a discharging of the capacitor.

Further, according to the present invention, it is possible to obtain an electrical double layer capacitor having a small disparity of the voltage, in which a switching element or a control circuit comprising the switching element and resistor, which are connected in series is connected to each unit capacitor in parallel.

What is claimed is:

1. An electrical double layer capacitor comprising a plurality of unit electrical double layer capacitors and a control circuit connected to said unit electrical double layer capacitor in parallel, wherein said control circuit includes a switching element.

2. An electrical double layer capacitor as claimed in claim 1 wherein said control circuit further comprises a resistor connected to said switching element in series.

3. An electrical double layer capacitor as claimed in claim 2 wherein said resistor is a variable resistor.

4. An electrical double layer capacitor as claimed in claim 1 wherein said switching element is composed of an element selected from a group consisting of a thyrister, a triac, a power transistor, a power MOS FET and an insulated gate bipolar transistor.

5. An electrical double layer capacitor as claimed in claim 1, further comprising an external switch for controlling an operation of said switching element.

6. An electrical double layer capacitor as claimed in claim 1, wherein said unit double layer capacitor comprises a pair of collectors, a pair of polarized electrodes disposed between said collectors, a separator sandwiched between said polarized electrodes, electrolyte filled in said polarized electrodes and said separator, and a gasket disposed around said polarized electrode and bonded to said collectors, said unit double layer capacitors being stacked on a surface of said collector so that they are connected in series, said switching element or said control circuit being integral with said gasket.

7. An electrical double layer capacitor device comprising a plurality of unit electrical double layer capacitors connected in series and a short-circuiting mechanism for short-circuiting each of said electrical double layer capacitors during a discharging.

8. An electrical double layer capacitor as claimed in claim 7 wherein said short-circuiting mechanism comprises a switching element connected to each of said unit electrical double layer capacitors in parallel.

9. An electrical double layer capacitor as claimed in claim 8, wherein said short-circuiting mechanism further comprises an external switch for controlling an operation of said switching element.

10. An electrical double layer capacitor as claimed in claim 8, wherein said switching element is composed of an element selected from a group consisting of a thyrister, a triac, a power transistor, a power MOS FET and an insulated gate bipolar transistor.

11. An electrical double layer capacitor as claimed in claim 7, wherein said unit double layer capacitor comprises a pair of collectors, a pair of polarized electrodes disposed between said collectors, a separator sandwiched between said polarized electrodes, electrolyte filled in said polarized electrodes and said separator, and a gasket disposed around said polarized electrode and bonded to said collectors, wherein said unit double layer capacitors are stacked on a surface of said collector so that they are connected in series.

\* \* \* \* \*